United States Patent
Itoh

[11] Patent Number: 5,734,483
[45] Date of Patent: *Mar. 31, 1998

[54] IMAGE SCANNER HAVING CONTACT-TYPE IMAGE SENSOR

[75] Inventor: Yoshiya Itoh, Atsugi, Japan

[73] Assignee: Ricoh Company, Ltd., Tokyo, Japan

[*] Notice: The term of this patent shall not extend beyond the expiration date of Pat. No. 5,610,731.

[21] Appl. No.: 715,090

[22] Filed: Sep. 17, 1996

Related U.S. Application Data

[63] Continuation of Ser. No. 421,919, Apr. 14, 1995, Pat. No. 5,610,731.

[30] Foreign Application Priority Data

Apr. 18, 1994 [JP] Japan ................................. 6-78727
May 31, 1994 [JP] Japan ................................. 6-118892
Oct. 11, 1995 [JP] Japan ................................. 7-288201

[51] Int. Cl.[6] ........................ H04N 1/04; G03G 15/28
[52] U.S. Cl. ........................ 358/496; 358/474; 358/497; 358/483; 399/206
[58] Field of Search ........................ 358/471, 474, 358/482, 483, 494, 496, 497, 498; 250/208.1, 216, 578.1, 239; 348/340; 399/206

[56] References Cited

U.S. PATENT DOCUMENTS 4,739,159 4/1988 Inokuchi.

FOREIGN PATENT DOCUMENTS 3-276958 12/1991 Japan.
7-193689 7/1995 Japan.

*Primary Examiner*—Edward L. Coles, Sr.
*Assistant Examiner*—Kimberly A. Williams
*Attorney, Agent, or Firm*—Oblon, Spivak, McClelland, Maier & Neustadt, P.C.

[57] ABSTRACT

There is provided an image scanner in which no shock is applied to a carrier moving an image sensor when the carrier is moved between an automatic document feeder and a contact glass on which an original document is placed. The image sensor is pressed against the contact glass by a spring. A plurality of rollers are provided between the image sensor and the contact glass so that the image sensor is pressed against the contact glass via the rollers. The rollers are separated from the contact glass by a separating member when the image sensor passes an area between the contact glass and the automatic document feeder. A housing of the image scanner is made of a plastic.

20 Claims, 9 Drawing Sheets

IMAGE SCANNER HAVING CONTACT-TYPE IMAGE SENSOR

CROSS REFERENCE TO RELATED APPLICATION

This application is continuation-in-part of the application, Ser. No. 08/421,919 filed on Apr. 14, 1995, now U.S. Pat. No. 5,610,731 for IMAGE SCANNER HAVING CONTACT-TYPE IMAGE SENSOR MOVABLE UNDER AUTOMATIC DOCUMENT FEEDER.

BACKGROUND OF THE INVENTION

1. Field of the Invention

The present invention generally relates to image scanning apparatuses used in copy machines or facsimile machines, and more particularly to an image scanning apparatus having a contact-type image sensor to scan an original image.

2. Description of the Prior Art

A CCD image sensor or a contact-type image sensor is commonly used in a conventional image scanner (image reading apparatus). In an image scanner applicable for scanning a book which image scanner can scan an original document of which position is fixed on a contact glass, a thickness of the image scanner can be reduced by using the contact-type image sensor rather than the CCD image sensor. Additionally, usage of the contact-type image sensor has advantages in that a driving system thereof is greatly simplified such that few adjustments are needed, and a distortion of an image due to an optical reduction system is not generated because the contact-type image sensor does not use the optical reduction system.

However, although the contact-type image sensor has the above-mentioned advantages, there is a problem in that a constant position of a focal point is not obtained over an entire scanning area unless a supporting construction of the image sensor has a high accuracy and rigidity.

In order to eliminate the above-mentioned problem, Japanese Laid-Open Patent Application No. 3-276958 suggests an image scanner having a contact-type image sensor in which the image scanner maintains a constant distance between a carriage base having the image sensor and a contact glass supporting the original document, thereby maintaining a constant focal point over the entire scanning area. In order to maintain the constant distance, one of sides of the carriage base is pressed against the contact glass by interposing a spacer mechanism, comprising such as a roller, between the carriage base and the contact glass.

Figure 1:
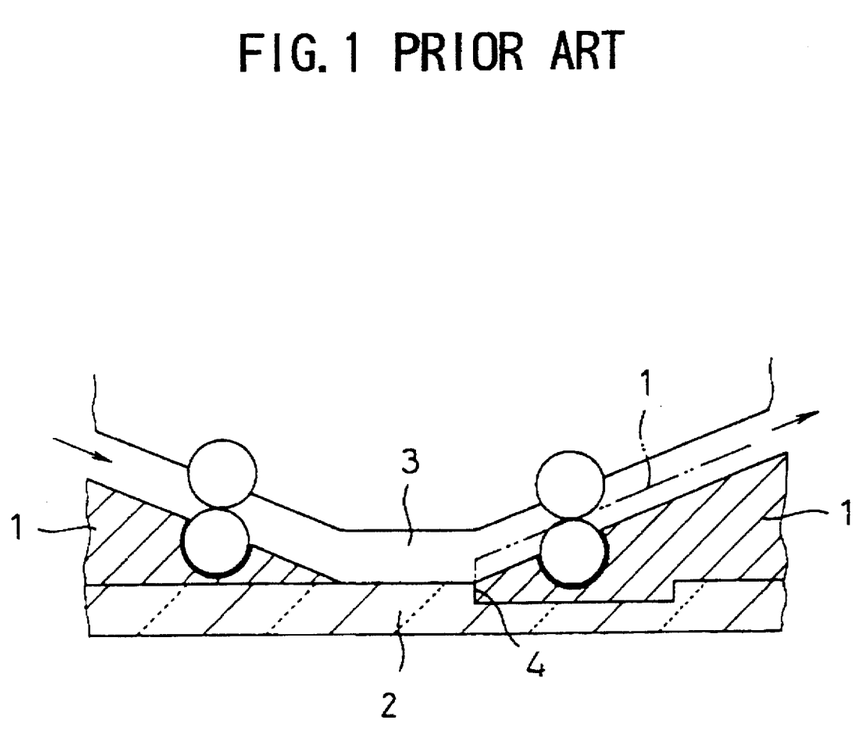
FIG. 1 is a view inside a conventional automatic document feeder.

When an automatic document feeder (ADF) is provided to the above-mentioned image scanner, and if the ADF is placed on a single contact glass in an area different from an area in which a scanning function of the book scanning is provided, no problem may occur in moving the contact-type image sensor while the carriage base having the image sensor is pressed against the contact glass. However, in such a case, the ADF must be placed on the contact glass, that is, conveying rollers of the ADF cannot be placed below the contact glass, and thus an entire construction of the image scanner becomes large. Additionally, if the ADF is merely placed on the contact glass as shown in FIG. 1, a guide member 1 of the ADF may protrudes from a top surface of the contact glass 2 in a conveying path 3 as indicated by chain lines in FIG. 1, and thus a leading edge of an original document sheet may be caught by the protrusion formed by the guide member 1. In order to eliminate such a problem, a recess 4 is formed in the top surface of the contact glass 2 to accommodate the guide member 1 so that no protrusion is formed in the conveying path 3. However, it is difficult and inconvenient to form the recess 4 in the top surface of the contact glass 2.

In order to eliminate a formation of the recess 4 in the contact glass 2, the image scanner may have two separate contact glasses, the carriage having the contact-type image sensor being moved over the two contact glasses while it is pressed against the two contact glasses. However, in such a case, a step or a gap may be formed between the two contact glasses, and thereby a shock may be applied to the spacer mechanism of the carriage having the contact-type image sensor in an area between the two contact glasses. Accordingly, there is a problem in that the contact-type image sensor or a spacer mechanism may become damaged after a long time of use during which the shock is applied repeatedly thereto.

Additionally, in the image scanner (hereinafter referred to as a book image scanner) in which an image sensor is moved under a contact glass on which an original document, such as an opened page of a book, is placed, a contact-type image sensor having a short focus, comprising such as a rod lens array, is commonly used because of an advantage of miniaturization. However, such an image sensor has a small margin against a displacement of a focal point because of its short focal distance. That is, in the image sensor having a rod lens array, an optical path from an image to a light detecting element extends in a direction parallel to a direction of a thickness of the image sensor, and thus a focal distance of the rod lens array is relatively short. Accordingly, if a position of the original document in a direction perpendicular to the top surface of the contact glass is not constant, or if a thickness of the contact glass is not uniform, there may be a problem in that a well-focused image is not obtained.

When the contact-type image sensor is used in the book image scanner, a level of the focal point relative to the contact glass must be uniform over an entire area where the image sensor is moved, and thus a high accuracy and rigidity are required for a construction of the image scanner. Accordingly, an entire construction of the image scanner becomes large and heavy although the contact-type image sensor, which is small and thin, is used in the image scanner.

SUMMARY OF THE INVENTION

It is a general object of the present invention to provide an image scanner having a contact-type image sensor in which image scanner the above-mentioned disadvantages are eliminated.

A more specific object of the present invention is to provide an image scanner having a contact-type image sensor in which image scanner no shock is applied to a carrier moving the image sensor when the carrier is moved between an area in which an automatic document feeder is provided and an area in which an original document is scanned by being placed on a contact glass.

Another object of the present invention is to provide an image scanner having a contact-type image sensor having a large focal depth so that a good focus is obtained even if a position of the original document in a direction perpendicular to a top surface of a contact glass is not constant.

Another object of the present invention is to provide an image scanner having a contact-type image sensor which image scanner is reduced in the total weight by reducing a weight of a frame accommodating the contact-type image sensor.

In order to achieve the above-mentioned objects, there is provided according to one aspect of the present invention an image scanner comprising:

a first contact glass on which a first original document is placed, the first contact glass having a first bottom surface opposite to a surface on which the first original document is placed;

an automatic document feeder having a second contact glass through which a second original document fed through the inside of the automatic document feeder is scanned, the automatic document feeder having a second bottom surface opposite to a side on which the second original document is fed, wherein the first bottom surface of the first contact glass and the second bottom surface of the second contact glass lie in the same plane;

an image sensor scanning the first original document while moving under the first contact glass, the image sensor scanning the second original document by moving to a fixed position directly under the second contact glass;

spacer means, provided on the image sensor, maintaining a distance between the image sensor and the first contact glass to be constant by contacting the first bottom surface of the first contact glass when the image sensor is scanning the first original document, the spacer means maintaining a distance between the image sensor and the second contact glass to be constant by contacting the second bottom surface of the second contact glass when the image sensor is scanning the second original document;

pressing means for pressing the image sensor via the spacer means against the first bottom surface of the first contact glass when the image sensor is scanning the first original document, and for pressing the image sensor via the spacer means against the second bottom surface of the second contact glass when the image sensor is scanning the second original document; separating means for separating the spacer means from the first bottom surface of the first contact glass when the image sensor is moved from a position under the first contact glass to the fixed position under the second contact glass, and for separating the spacer means from the second bottom surface of the second contact glass when the image sensor is moved from the fixed position under the second contact glass to a position under the first contact glass; and a housing, formed by plastic molding, accommodating the image sensor, the first contact glass being mounted on the housing.

According to the present invention, the spacer means is separated from the first contact glass or the second contact glass when the image sensor is moved from one of the first contact glass and the second contact glass to the other. Thus, there is no shock applied to the image sensor when the image sensor is moved between the first contact glass and the second contact glass. Additionally, since the housing is made of plastic which is much lighter than that formed by a metal plate, the weight of the entire image scanner is reduced. This is achieved since the distance between the image sensor and each of the first and second contact glasses is accurately maintained to become constant, when the housing is deformed, due to the pressing means pressing the image sensor to the first contact glass and the second contact glass.

In one embodiment according to the present invention, the spacer means may comprise a plurality of rollers provided on the image sensor so that the rollers roll on the first bottom surface of the first contact glass when the image sensor is moved under the first contact glass. Additionally, the separating means may comprise a driving unit which moves the image sensor downward and a power unit supplying a driving power to the driving unit. The power unit may comprise a rotary actuator. The driving unit may comprise a rack and a pinion gear engaging with the rack. The pinion gear may have teeth on only a part of a periphery thereof. The power unit may comprise a linear actuator. The linear actuator may comprise a solenoid and a plunger reciprocally provided in the solenoid.

In one embodiment according to the present invention, the separating means may comprise a protruding member provided under an area between the first contact glass and a third bottom surface of the automatic document feeder, the third bottom surface including the second bottom surface of the second contact glass, the image sensor being moved underneath the protruding member when the image sensor is moved under the area so that the image sensor is pressed down by the protruding member. The protruding member may be fixed on the automatic document feeder.

Additionally, the separating means may comprise a thin plate provided under an area between the first contact glass and a third bottom surface of the automatic document feeder, the third bottom surface including the second bottom surface of the second contact glass, the spacer means being moved underneath the thin plate when the image sensor is moved under the area.

In one embodiment according to the present invention, the image sensor may comprise an optical system which projects a light beam onto the original document placed on the first contact glass and receives the light beam reflected by the original document, the light beam reflected by the original document being focused on a light receiving element provided in the optical system, a length of an optical path between the original document and the light receiving element being greater than a distance between the original document and the light receiving element. Additionally, the spacer means may comprise a plurality of rollers provided on the image sensor so that the rollers roll on the bottom surface of the first contact glass when the image sensor is moved under the first contact glass.

The optical system of the image sensor may comprise:

a lens array having a plurality of lenses aligned with a predetermined pitch;

a roof mirror array having a plurality of roof mirrors arranged correspondingly to the lenses, a number of the lenses being equal to a number of the roof mirrors, one of the roof mirrors reflecting the light beam passed through a corresponding one of the lenses and returning the light beam to the corresponding one of the lenses; and a deflecting mirror deflecting the light beam twice passed through the corresponding one of the lenses to the light receiving element.

Additionally, a focal point of the optical system of the image sensor is positioned inside the first contact glass so that the light beam passed through the first contact glass is focused on a top surface of the first contact glass.

In the image scanner according to the above-mentioned invention, the housing may be made of a plastic having a low static charge characteristic.

Additionally, there is provided according to another aspect of the present invention, an image scanner comprising:

a contact glass on which an original document is placed, the contact glass having a bottom surface opposite to a surface on which the original document is placed;

an image sensor scanning the original document while moving under the first contact glass;

spacer means, provided on the image sensor, maintaining a distance between the image sensor and the contact glass to be constant by contacting the bottom surface of the contact glass when the image sensor is scanning the original document;

pressing means for pressing the image sensor via the spacer means against the bottom surface of the contact glass when the image sensor is scanning the original document; and a housing, formed by plastic molding, accommodating the image sensor, the first contact glass being mounted on the housing.

In one embodiment, the housing may have an opening to which the contact glass is mounted so that interior parts accommodated in the housing are assembled through the opening. Additionally, the housing may be made of a plastic having a low static charge characteristic. Further, the housing may have an integrally formed finished outer wall.

Other objects, features and advantages of the present invention will become more apparent from the following detailed description when read in conjunction with the accompanying drawings.

DETAILED DESCRIPTION OF THE PREFERRED EMBODIMENTS

Figure 2:
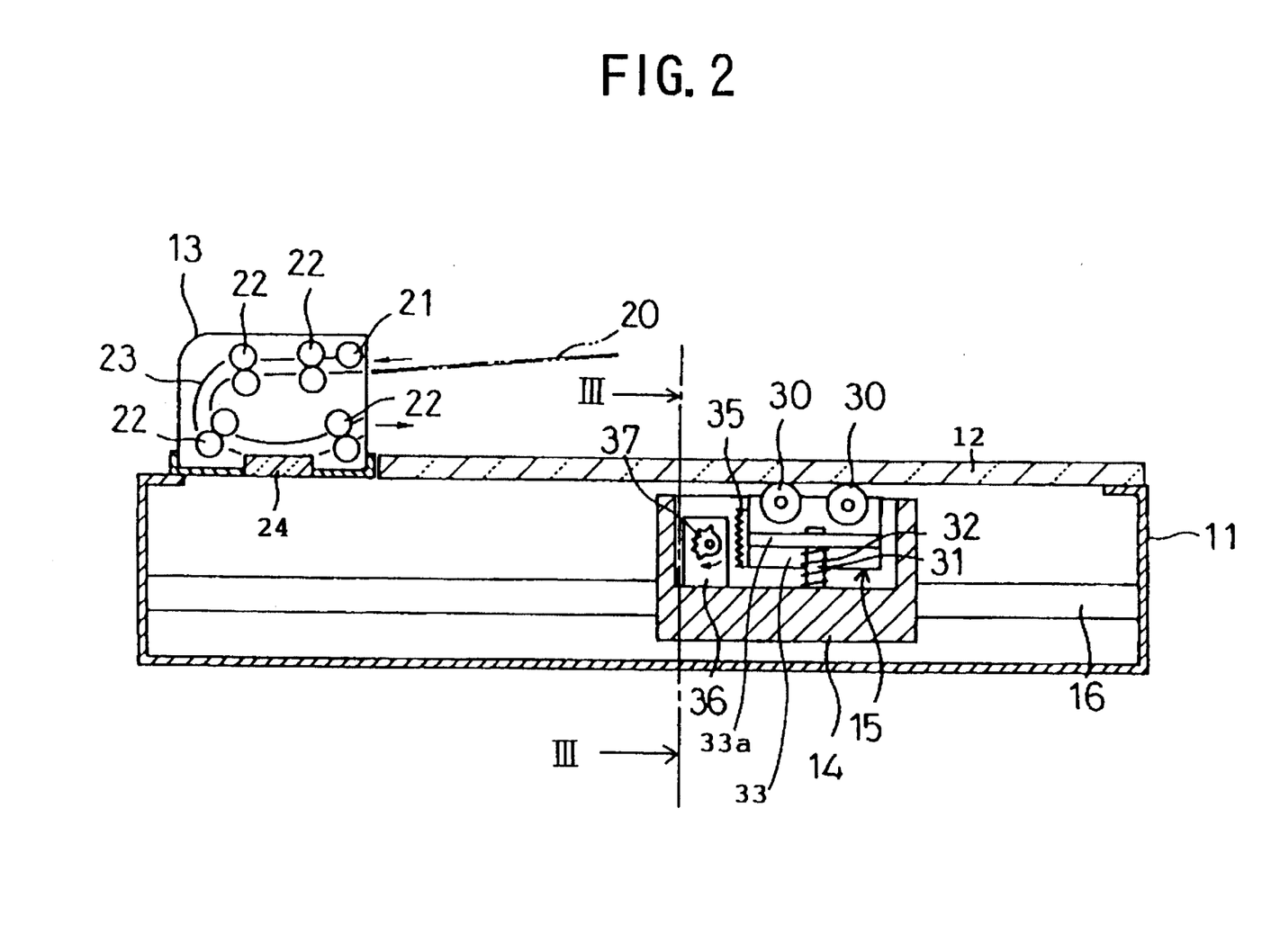
FIG. 2 is a cross-sectional view of the first embodiment of an image scanner according to the present invention.
Figure 3:
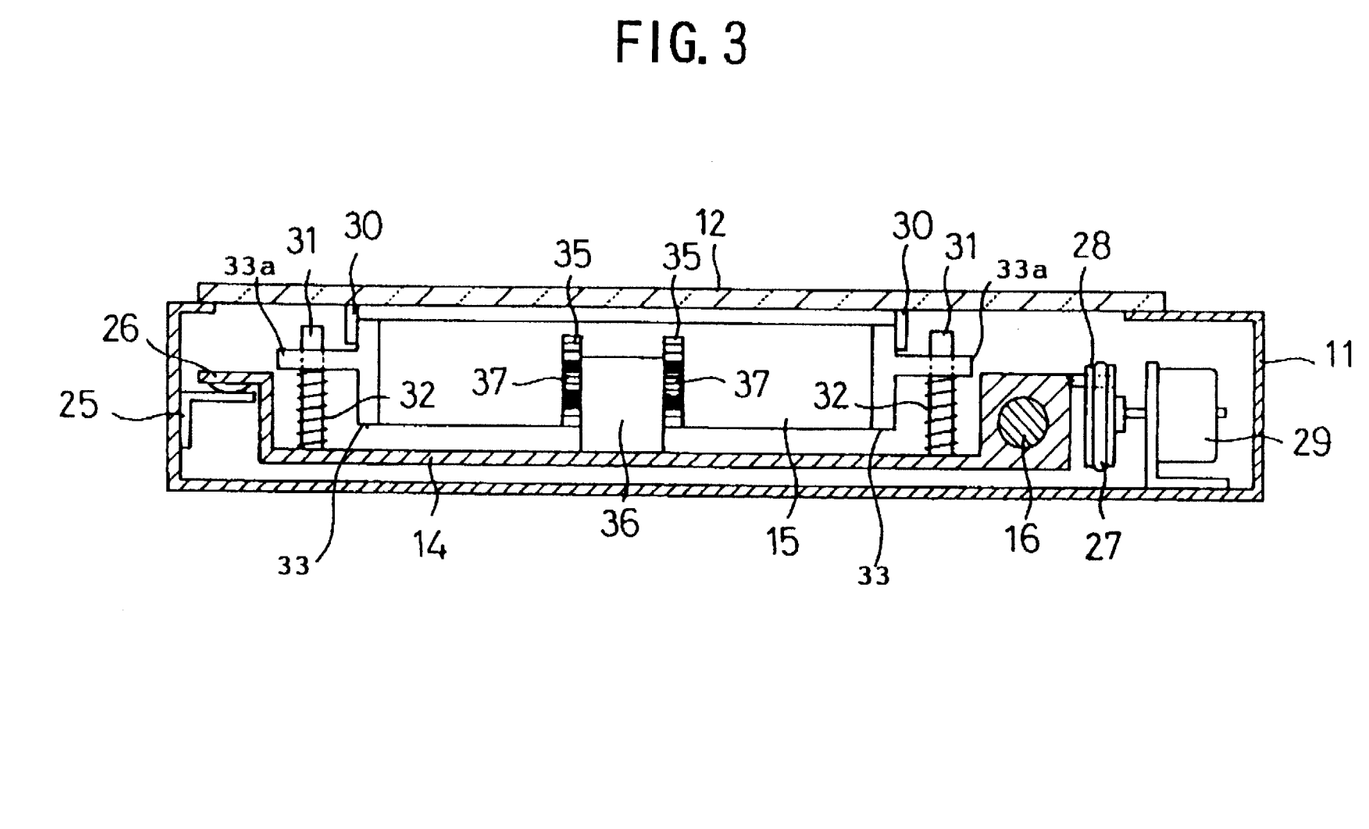
FIG. 3 is a cross-sectional view taken along a line III—III in FIG. 2.

A description will now be given of a first embodiment of an image scanner according to the present invention. FIG. 2 is a cross-sectional view of the first embodiment of the image scanner according to the present invention. FIG. 3 is a cross-sectional view taken along a line III—III in FIG. 2.

In FIGS. 2 and 3, the first embodiment of the image scanner according to the present invention comprises a main body 11, a contact glass 12, an automatic document feeder (ADF) 13, a carriage 14 having a contact-type image sensor 15 and a guide shaft 16. The contact glass 12 is fixed on a top of the main body 11, and an original document to be scanned is placed thereon. The ADF 13 is positioned on a top of the main body 11 and is adjacent to the contact glass 12. The carriage 14 on which the contact-type image sensor 15 is mounted is moved in an area positioned under the contact glass 12 and the ADF 13. The movement of the carrier 14 is guided by the guide shaft 16 provided in the main body 11.

The ADF 13 is a single unit comprising a supplying roller 21, a plurality of conveying rollers 22, guide plates 23 and a contact glass 24. The supplying roller 21 feeds original documents placed in a supply tray 20 into the ADF 13 one by one. Each original document fed into the ADF 13 is conveyed and guided by the conveying rollers 22 and guide plates 23 so that the original document passes over the contact glass 24 through which the original document is scanned by the contact-type image sensor 15. The ADF 13 is easily handled and removed from the main body 11 as it is packed into a single unit.

The carriage 14 is supported, as shown in FIG. 3, by the guide shaft 16 on one side thereof, and a sliding protrusion 26 is formed on the other side thereof. The sliding protrusion 26 slides on a rail member 25 formed on the main body 11. The carriage 14 is driven by a wire 27 of which opposite ends are connected to the carriage 14. The wire 27 is half wound on a pulley 28, and the pulley 28 is rotated by a reversible motor 29. Accordingly, the carriage 14 can be reciprocally moved by driving forces generated by the reversible motor 29 and transmitted through the pulley 28 and the wire 27.

The contact-type image sensor 15 moves under the contact glass 12 or moves to a position directly under the contact glass 24 of the ADF 13 so as to scan an image of an original document placed on the contact glass 12 or an original document fed through the ADF 13, respectively. Rollers 30, which act as spacers, are rotatably supported on an upper portion of the image sensor 15. Additionally, a side wing 33 is mounted on each of side surfaces of the image sensor 15 which side surfaces are parallel to an axis of the guide shaft 16, and a wing portion 33a extends from the side wing 33. The wing portion 33a of the side wing 30 has a through hole into which a shaft 31 protrusively provided on the carriage 14 is inserted. A spring 32 is fit on the shaft 31 between the carriage 14 and the wing portion 33a of the side wing 33 so that the spring 32 presses the image sensor 15 toward a bottom surface of the contact glass 12 or the contact glass 24.

Racks 35 are attached on one of surfaces facing in moving directions of the carriage 14. A motor 36 is fixed on the carriage 14 which motor 36 has an output shaft of which opposite ends are provided with pinion gears 37 engaging with the respective racks 35. Each of the pinion gears 37 has teeth on only a part of its periphery, and thus the pinion gears 37 engage with the respective racks 35 only when the teeth are rotated to a predetermined position. FIG. 2 shows a state in which the teeth of the pinion gears 37 are not engaged with the racks 37. The pinion gears 37 are rotated when the motor 36 is driven, and engages with the racks 35 to move the image sensor downward. Accordingly, the racks 35, the pinion gears 37 and the motor 36 constitute separating means, the racks 35 and the pinion gears 37 together correspond to a driving unit, and the motor 36 corresponds to a driving power source.

In the above-mentioned construction, when an original document placed on the contact glass 12 is scanned, the carriage 14 moves under the contact glass 12 by being pulled by the wire 27 while a distance between the image sensor 15 and the bottom surface of the contact glass 12 is maintained to be constant as the image sensor 15 is pressed against the contact glass 12 via the rollers 30 interposed therebetween. The scanning of the original document is performed while the carriage 14 is moving.

When the carriage 14 and thus the image sensor 15 moves from an area under the contact glass 12 to an area directly under the contact glass 24 to perform a scanning operation of an original document fed through the ADF 13, the pinion gears 37 are rotated by the motor 36 in a direction indicated by an arrow near the pinion gear 37 in FIG. 2. As the pinion gears 37 rotate toward the racks 35, the teeth of the pinion gears 37 are engaged with the respective racks 35, and thus the image sensor 15 is moved downward, resulting in the rollers 30 mounted on the image sensor 15 separating from the bottom surface of the contact glass 12.

In the above-mentioned state in which the rollers 30 are separated from the contact glass 12, the carriage 14 is moved directly under the contact glass 24 of the ADF 13. In this state, the motor 36 is reversed to disengage the teeth of the pinion gears 37 from the racks 35. The image sensor 15 is thereby moved by the springs 32 toward the contact glass 24, and thus the rollers 30 contact the contact glass 24. In this condition, a distance the same as the distance when the image sensor 15 is under the contact glass 12 is provided between the image sensor 15 and the contact glass 24. After the rollers 30 contact the contact glass 24, the ADF 13 is operated to feed the original document therethrough, and then a scanning operation of the image sensor 15 is started while the image sensor 15 is maintained to be at a fixed position directly under the contact glass 24.

When the image sensor 15 is moved from the fixed position under the contact glass 24 to the area under the contact glass 12 to perform another scanning operation, similar processes are taken to separate the rollers 30 from the contact glass 24.

Accordingly, the rollers 30 never contact an area between the contact glass 12 and the contact glass 24 in which area a step or a gap is formed. Thus, no shock is applied to the image sensor 15 and the carriage 14, providing a constant level of a focal point over a long time.

Figure 4:
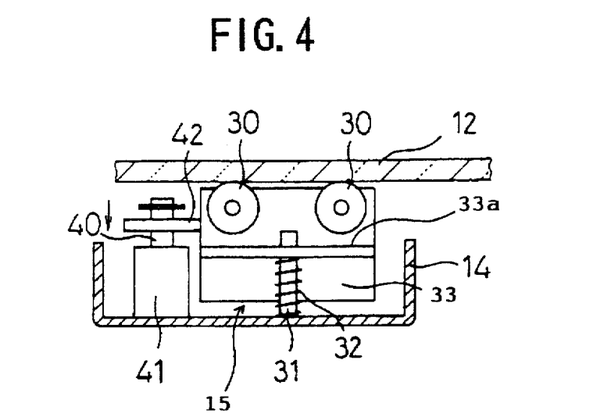
FIG. 4 is a side view of an essential part of a second embodiment of an image scanner according to the present invention.

A description will now be given of a second embodiment of an image scanner according to the present invention. FIG. 4 is a side view of an essential part of the second embodiment of the image scanner according to the present invention. In FIG. 4, parts that are the same as the parts shown in FIGS. 2 and 3 are given the same reference numerals, and descriptions thereof will be omitted.

In the second embodiment, the rack and pinion mechanism of the first embodiment is replaced with a linear actuator comprising a solenoid 41. The solenoid 41 is fixed to the carriage 14, and a plunger 40 is extended from the solenoid 41. The end of the plunger 40 engages with an arm member 42 extending from a side surface of the image sensor 15. When the solenoid 41 is activated, the plunger 40 is attracted into the solenoid 41, and thus the image sensor 15 is moved downwardly to separate the rollers 30 from the contact glass 12 or the contact glass 24. In this embodiment, because no gear mechanism is provided, there is no noise due to the gear mechanism, and thus up and down operations of the image sensor 15 can be performed with relatively low noise.

Figure 5A:
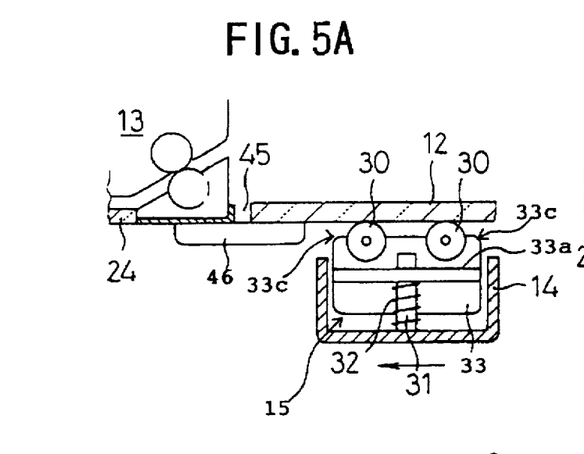
FIGS. 5A and 5B are side views showing an essential part of a third embodiment of an image scanner according to the present invention.
Figure 5B:
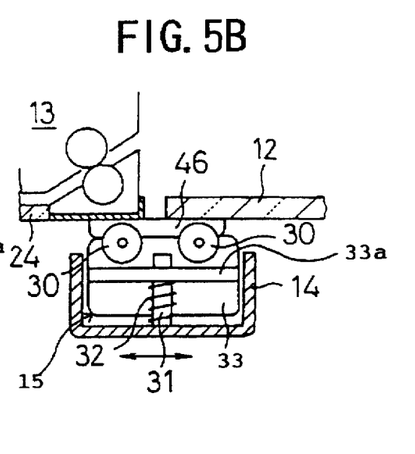

A description will now be given, with reference to FIGS. 5A and 5B, of a third embodiment of the image scanner according to the present invention. FIGS. 5A and 5B are side views showing an essential part of the third embodiment of an image scanner according to the present invention. In FIGS. 5A and 5B, parts that are the same as the parts shown in FIGS. 2 and 3 are given the same numerals, and descriptions thereof will be omitted.

In the third embodiment, no mechanical separating means is provided as is in the first and second embodiments, and instead a protruding member 46 is merely provided under an area 45 between the contact glass 12 and a bottom surface of the ADF 13 which bottom surface is in the same level with the bottom surface of the contact glass 24. When the image sensor 15 moves under the area 45, the image sensor 15 is moved downward as the image sensor 15 is forced underneath the protruding member 46, and thus the rollers 30 are separated from the contact glass 12 or the contact glass 24. Accordingly, no shock is applied to the rollers 30 when the carriage moves under the area 45 between the contact glass 12 and the ADF 13. The protruding member 46 may be placed so that a top surface of each of the side wings 33 is forced underneath the protruding member 46. A corner 33c of each of the side wings 33 is rounded so that the side wings 33 can smoothly move underneath the protruding member 46. A slope may be formed on the corners 33c of the side wings 33 instead of providing a roundness. Additionally, the protruding member 46 may be fixed on a bottom surface of the ADF 13 so that the protruding member 46 is automatically placed in an area adjacent to the area 45 when the ADF 13 is attached to the image scanner.

A construction of the third embodiment is achieved at a reduced cost because no mechanical means is provided to separate the rollers 30 from the contact glass 12 or the bottom surface of the ADF 13. Additionally, the carriage 14 can be made small since an area in which the mechanical separating means is provided is not needed in the carriage 14.

Figure 6:
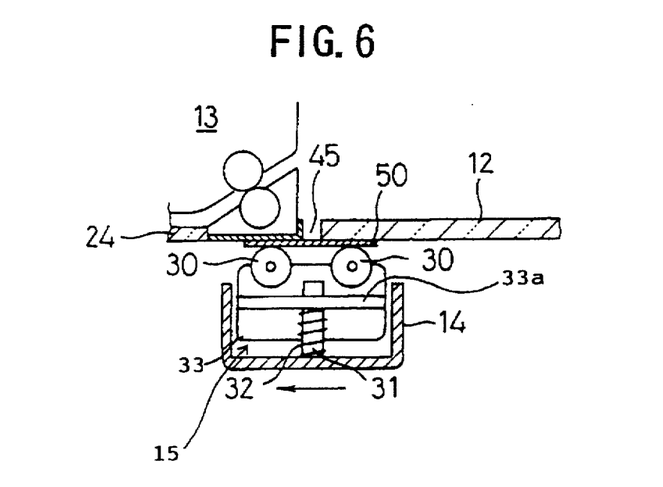
FIG. 6 is a side view of an essential part of a fourth embodiment according to the present invention.

A description will now be given, with reference to FIG. 6, of a fourth embodiment of an image scanner according to the present invention. FIG. 6 is a side view of an essential part of the fourth embodiment of the image scanner according to the present invention. In FIG. 6, parts that are the same as the parts shown in FIGS. 2 and 3 are given the same reference numerals, and descriptions thereof will be omitted.

In the fourth embodiment, a sheet 50 made of a thin plate is provided in the area 45 instead of the protruding member 46 of the above-mentioned third embodiment. That is, the sheet 50 covers a gap or a step formed in the area 45 so that the rollers 30 are forced underneath the sheet 50 when the carriage passes the under the area 45 between the contact glass 12 and the ADF 13. According to the present embodiment, a shock applied to the rollers 30 is minimized due to the sheet 50 to protect the outer surfaces of the rollers 30 from being damaged. Since the sheet 50 is merely applied to the area 45, the present embodiment can reduce the shock applied to the rollers 30 with a reduced cost.

Figure 7:
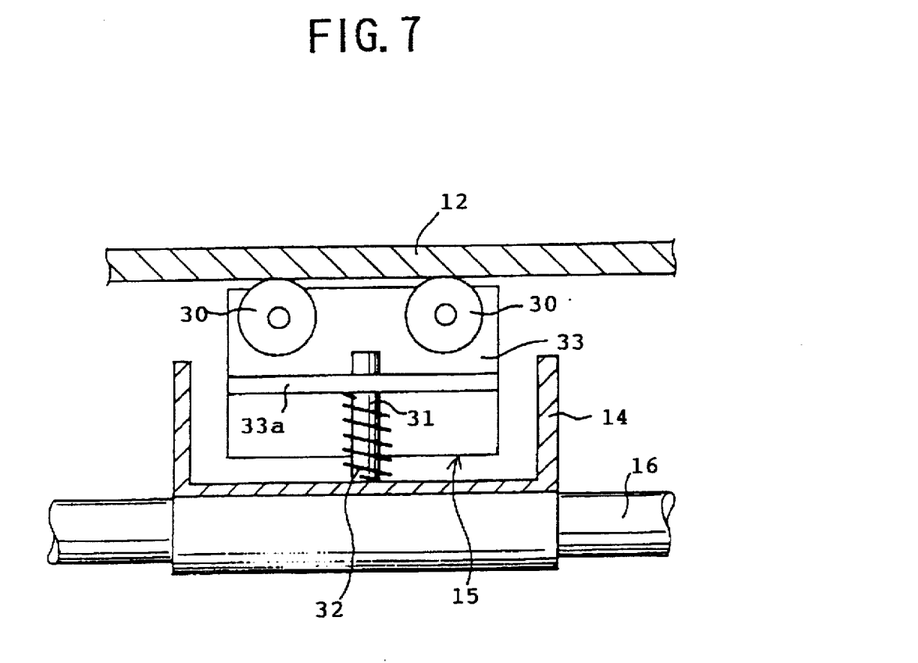
FIG. 7 is a side view of a supporting construction of an image sensor in a fifth embodiment of an image scanner according to the present invention.
Figure 8:
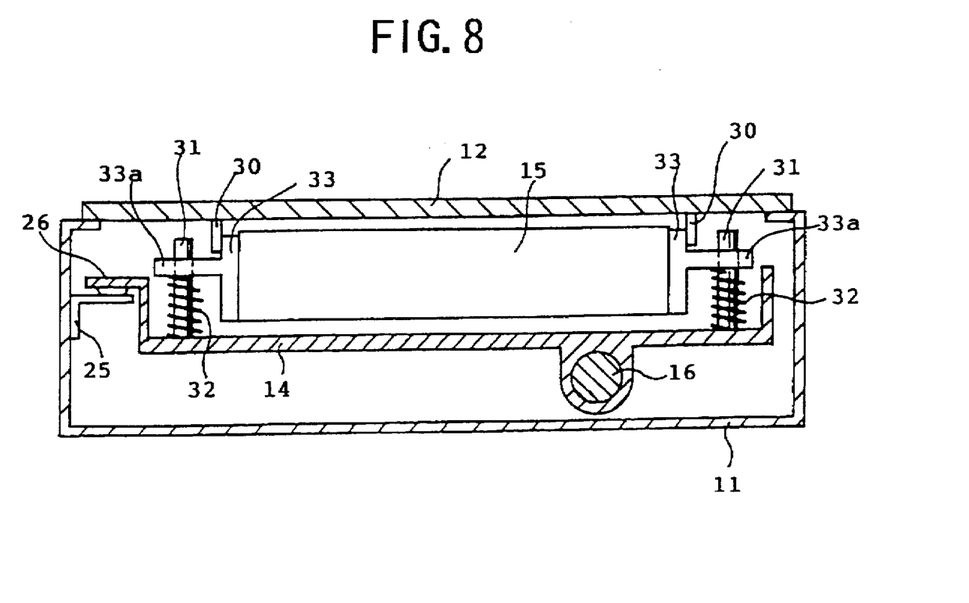
FIG. 8 is a front view of the supporting construction shown in FIG. 7.
Figure 9:
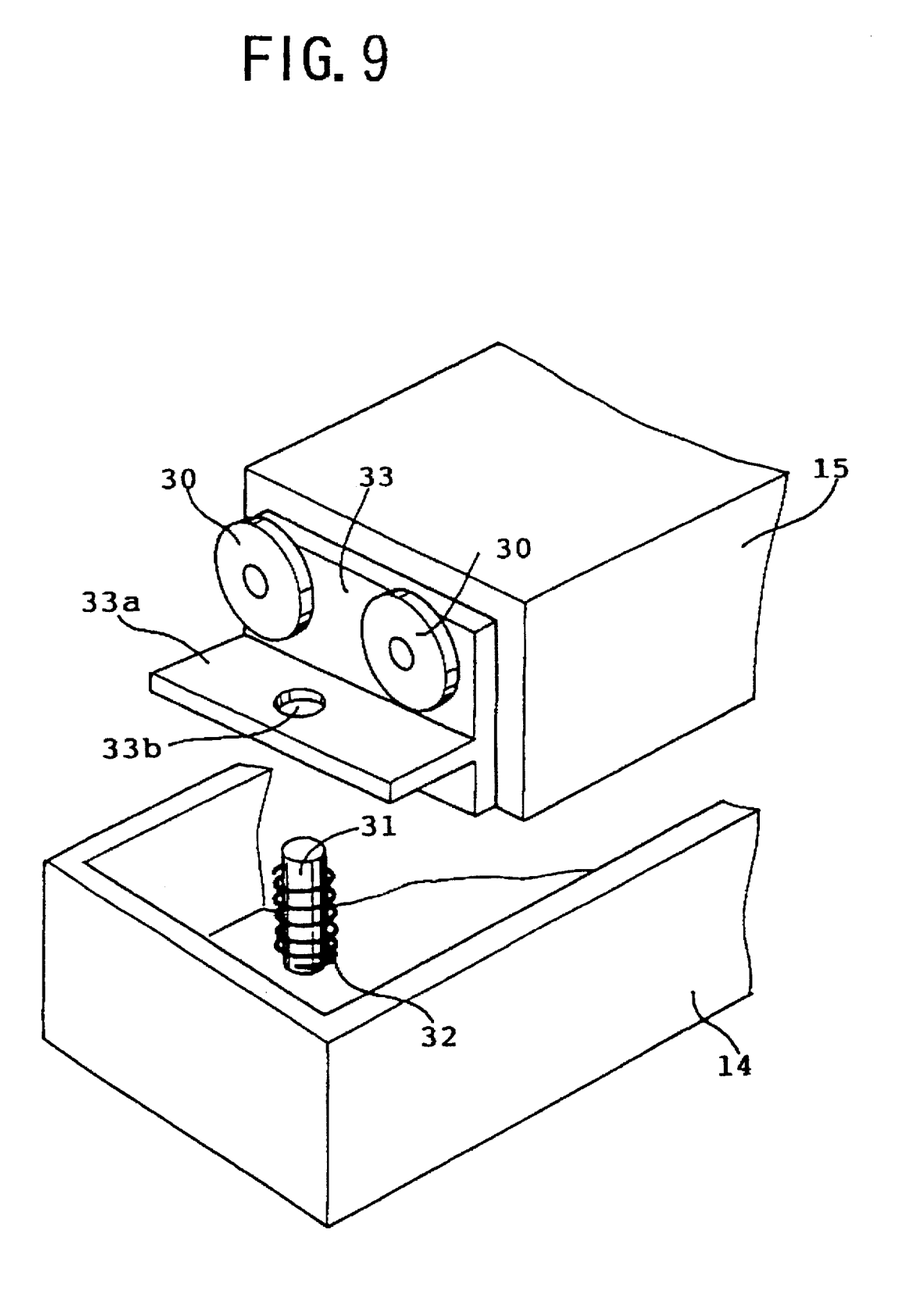
FIG. 9 is a perspective view of the supporting construction shown in FIG. 7.

A description will now be given of a fifth embodiment of an image scanner according to the present invention. FIG. 7 is a side view of a supporting construction of the image sensor 15 in the fifth embodiment. FIG. 8 is a front view of the supporting construction shown in FIG. 7. FIG. 9 is a perspective view of the supporting construction shown in FIG. 7. In FIGS. 7 to 9, parts that are the same as the parts shown in FIGS. 2 and 3 are given the same reference numerals, and descriptions thereof will be omitted.

In the fifth embodiment, an image sensor 15 is supported by the same construction as that of the first embodiment as shown in FIGS. 7 to 9. Accordingly, the image sensor 15 is pressed against a contact glass 12 with rollers 30 positioned therebetween.

Figure 10:
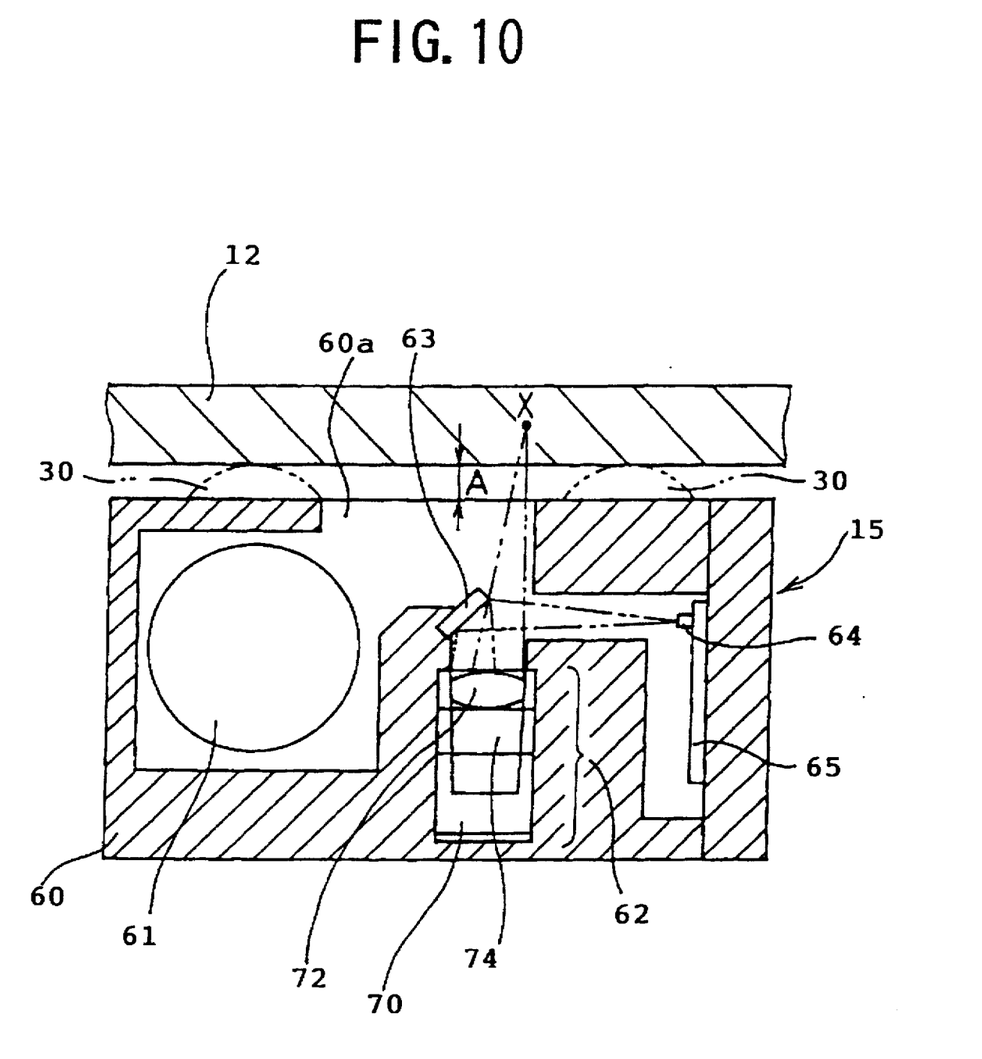
FIG. 10 is a cross-sectional view of a contact-type image sensor, which is an essential part of the fifth embodiment of an image scanner according to the present invention.

FIG. 10 is a cross-sectional view of the contact-type image sensor 15, which is an essential part of the fifth embodiment of the image scanner according to the present invention. In FIG. 10, parts that are the same as the parts shown in FIGS. 2 and 3 are given the same reference numerals, and descriptions thereof will be omitted. It should be noted that parts of the fifth embodiment, which parts are not shown in FIG. 10, are the same as that of the above-mentioned first to fourth embodiments.

The image sensor 15 of the fifth embodiment comprises a sensor frame 60, a light source 61, a roof mirror lens array (RMLA) 62, a deflection mirror 63 and light receiving elements 64 provided on a sensor substrate 65. The RMLA 62 may be an equal-magnification image forming element array.

Figure 11:
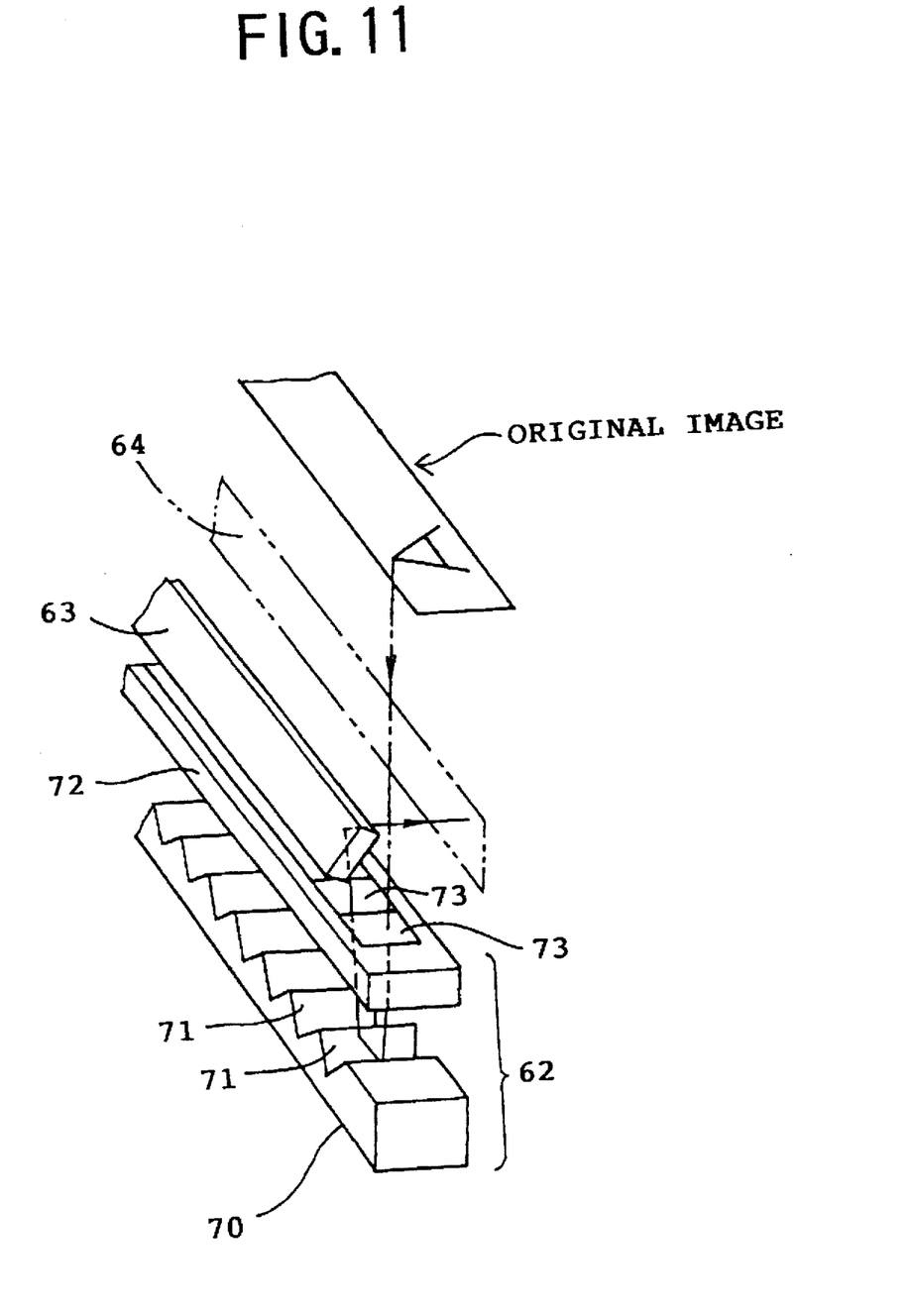
FIG. 11 is a perspective view of an optical system provided in the image sensor shown in FIG. 10.

FIG. 11 is a perspective view of an optical system provided in the image sensor 15. The RMLA 62 comprises a roof mirror array 70 and a lens array 72. The roof mirror array 70 has a plurality of roof mirrors 71 arranged on a straight line. The lens array 72 has a plurality of lenses 73 aligned with the straight line on which the roof mirrors 71 are arranged. An aperture plate 74 (not shown in FIG. 11) is provided between the roof mirror array 70 and the lens array 72.

In the image sensor 15, a light beam is projected onto an original document placed on the contact glass 12 (or the contact glass 24) through the contact glass 12, and the light beam reflected by the original document returns inside the image sensor 15. The light beam returned inside the image sensor 15 passes through the optical system provided in the image sensor 15, and is finally incident on the light receiving elements 64. More specifically, the light beam returned inside the image sensor 15 is incident on one of the lenses 73 of the lens array 72 first. The light beam passes through the one of the lenses 73, is reflected by the corresponding one of the roof mirrors 71, and returns to the one of the lenses 73. The light beam passed through twice the one of the lenses 73 is then reflected by the deflection mirror 63 toward a corresponding one of the light receiving elements 64. That is, the light beam incident on the deflection mirror 63 is deflected approximately 90 degrees.

In the above-mentioned optical system of the present embodiment, the lens array 72, the roof mirror array 70, the deflection mirror 63 and the light receiving elements 64 are arranged so that the light beam reflected by the original document is focused on a focal plane in which light receiving surfaces of the light receiving elements 64 are arranged. Since the optical path of the light beam from the lens array 72 to the focal plane on the light receiving elements 64 is folded by the roof mirror array 70 and bent by the deflection mirror 63, the substantial focal distance between the optical center of the lens array 73 and the focal plane of the light receiving elements 64 is longer than that of the optical path which is not folded by a mirror. Accordingly, a greater focal depth can be obtained by the present embodiment, and thus a margin to a displacement of the original document in a direction perpendicular to the top surface of the contact glass 12 becomes large.

It should be noted that a focal point of the lens array 72 is positioned at a position indicated by an "X" located inside the contact glass 12 so that the light beam passed through said contact glass 12 is focused on a top surface of said contact glass on which the original document to be scanned is placed.

In the above-mentioned fifth embodiment, the contact-type image sensor 15 having a small thickness with a large focal depth is used with rollers 30 which act to maintain a distance between the contact glass 12 and the image sensor 15 as small as possible. Accordingly, a high accuracy and rigidity are not required for an entire construction of the image scanner, and thus a thickness and a weight of the image scanner are greatly reduced.

In the above-mentioned image scanners according to the first to fifth embodiments of the present invention, the contact-type image sensor is accommodated in the main body 11 corresponding to a frame housing. In the conventional image scanner, the frame housing is made of a rigid material such as a metal plate so that the frame housing is prevented from being deformed. This is because if the frame housing is deformed, it greatly influences the accuracy of the scanning operation of the image scanner.

More specifically, in the conventional image scanner using a differential mirror method in which a charge coupled device (CCD) is used as an optical device, an optical path is folded by a mirror. This structure is very sensitive to an offset of a reflection angle of the optical path. Thus, the frame housing of the image scanner using the differential mirror method is made of a metal plate so as to provide a rigidity and thereby reduce a deformation of the frame housing.

Additionally, in the conventional image scanner having a contact-type image sensor, a distance between the contact glass and the image sensor must be accurately maintained to become constant since the focal distance of the image sensor is small and has little allowable tolerance in the focal distance. Thus, this image scanner also has a frame housing made of a rigid material such as a metal plate to prevent a deformation of the frame housing.

In the image scanners according to the above-mentioned embodiments of the present invention, the image sensor 15 is supported by the carriage 14 which slides on the guide shaft 16. The guide shaft 16 is supported, in turn, by the main body 11 corresponding to the frame housing. However, the image sensor 15 is always pressed against the contact glass 12 by a pressing force of the spring 32 via the rollers 30 even when the frame housing is deformed which results in an offset of the guide shaft 16 and the carriage 14 from a normal position. Thus, the distance between the image sensor 15 and the contact glass 12 is accurately maintained to be constant even when the frame housing is deformed.

In virtue of the above-discussed advantage of the mounting structure of the image sensor, the main body 11 corresponding to the frame housing in each of the image scanners according to the embodiments of the present invention is made of a plastic which is much lighter than a metal plate. As for the plastic used for the frame housing, ACS resin is used which has a low static charge characteristic.

Figure 12:
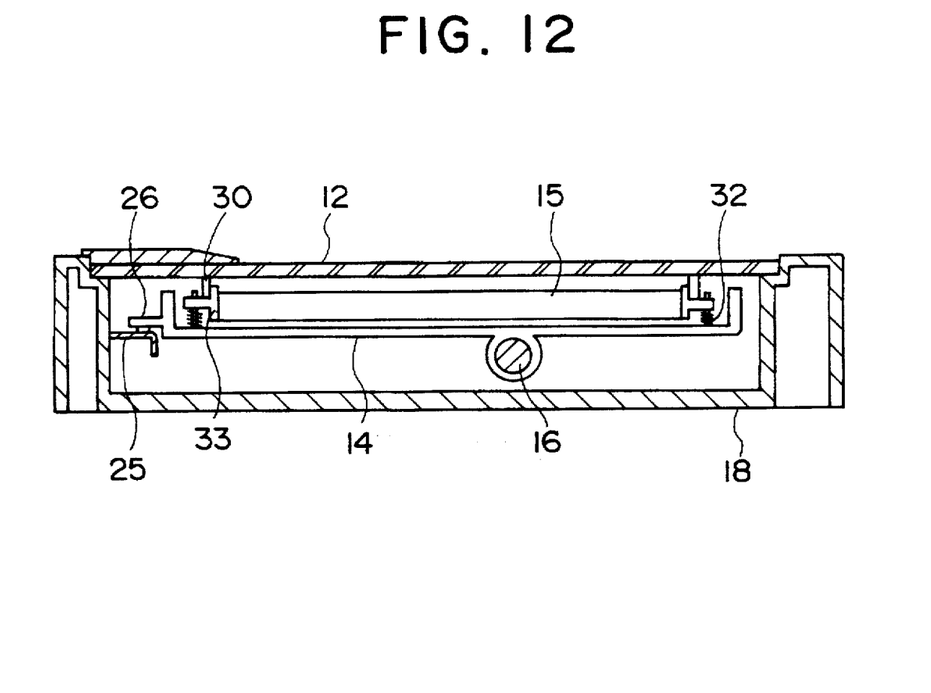
FIG. 12 is a cross-sectional view of an image scanner according to a sixth embodiment of the present invention.
Figure 13:
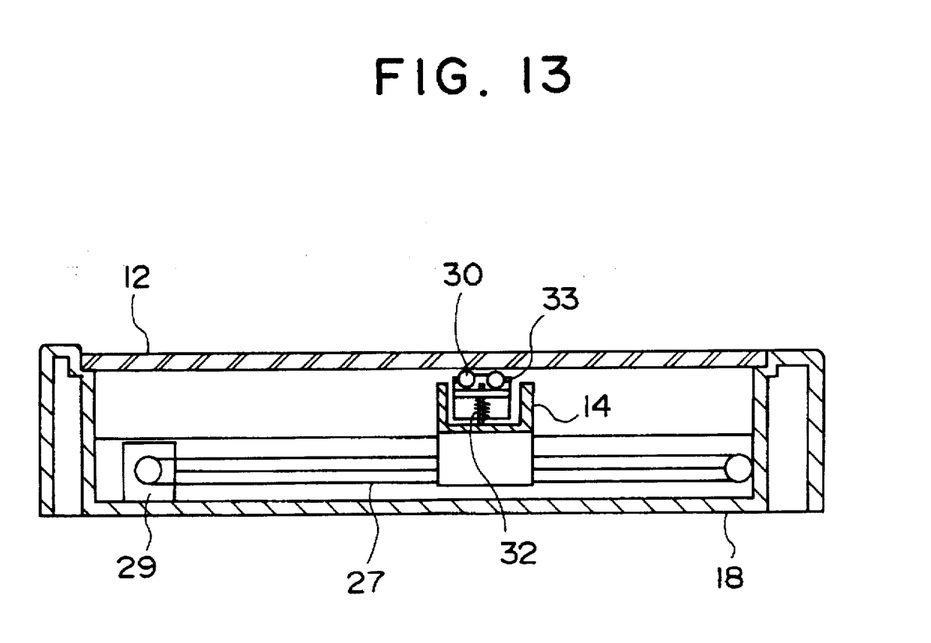
FIG. 13 is another cross-sectional view of the image scanner shown in FIG. 12.

FIGS. 12 and 13 are cross-sectional views of an image scanner according to the sixth embodiment of the present invention which is provided with a frame housing 18 made of a plastic. In FIGS. 12 and 13, parts that are the same as the parts shown in FIGS. 2 and 3 are given the same reference numerals, and descriptions thereof will be omitted.

Since the frame housing 18 is formed by plastic molding, an outer surface of the frame housing can become a finished surface of the image scanner. Thus, there is no need to provide a finished outer wall on an outer surface of the frame housing 18.

When assembling the image scanner, the interior parts such as the rail member 25, the motor 29, the image sensor 15, etc., can be assembled into the frame housing 18 from one side (upper side in FIG. 12). Then, the contact glass 12 is placed on the frame housing 18. Thus, the image scanner according to the present embodiment can be assembled from one side. This reduces the number of parts and manufacturing cost.

The present invention is not limited to the specifically disclosed embodiments, and variations and modifications may be made without departing from the scope of the present invention.

What is claimed is:

1. An image scanner comprising:
   a first contact glass on which a first original document is placed, said first contact glass having a first bottom surface opposite to a surface on which said first original document is placed;
   an automatic document feeder having a second contact glass through which a second original document fed through the inside of the automatic document feeder is scanned, said automatic document feeder having a second bottom surface opposite to a side on which said second original document is fed, wherein said first bottom surface of said first contact glass and said second bottom surface of said second contact glass lie in the same plane;
   an image sensor scanning said first original document while moving under said first contact glass, said image sensor scanning said second original document by moving to a fixed position directly under said second contact glass;
   spacer means, provided on said image sensor, maintaining a distance between said image sensor and said first contact glass to be constant by contacting said first bottom surface of said first contact glass when said image sensor is scanning said first original document, said spacer means maintaining a distance between said image sensor and said second contact glass to be constant by contacting said second bottom surface of said second contact glass when said image sensor is scanning said second original document;
   pressing means for pressing said image sensor via said spacer means against said first bottom surface of said first contact glass when said image sensor is scanning said first original document, and for pressing said image sensor via said spacer means against said second bottom surface of said second contact glass when said image sensor is scanning said second original document;
   separating means for separating said spacer means from said first bottom surface of said first contact glass when said image sensor is moved from a position under said first contact glass to said fixed position under said second contact glass, and for separating said spacer means from said second bottom surface of said second contact glass when said image sensor is moved from said fixed position under said second contact glass to a position under said first contact glass; and
   a housing, formed by plastic molding, accommodating said image sensor, said first contact glass being mounted on said housing.

2. The image scanner as claimed in claim 1, wherein said spacer means comprises a plurality of rollers provided on said image sensor so that said rollers roll on said first bottom surface of said first contact glass when said image sensor is moved under said first contact glass.

3. The image scanner as claimed in claim 1, wherein said separating means comprises a driving unit which moves said image sensor downward and a power unit supplying a driving power to said driving unit.

4. The image scanner as claimed in claim 3, wherein said power unit comprises a rotary actuator.

5. The image scanner as claimed in claim 4, wherein said driving unit comprises a rack and a pinion gear engaging with said rack.

6. The image scanner as claimed in claim 5, wherein said pinion gear has teeth on only a part of a periphery thereof.

7. The image scanner as claimed in claim 3, wherein said power unit comprises a linear actuator.

8. The image scanner as claimed in claim 7, wherein said linear actuator comprises a solenoid and a plunger reciprocally provided in said solenoid.

9. The image scanner as claimed in claim 1, wherein said separating means comprises a protruding member provided under an area between said first contact glass and a third bottom surface of said automatic document feeder, said third bottom surface including said second bottom surface of said second contact glass, said image sensor being moved underneath said protruding member when said image sensor is moved under said area so that said image sensor is pressed down by said protruding member.

10. The image sensor as claimed in claim 9, wherein said protruding member is fixed on said automatic document feeder.

11. The image scanner as claimed in claim 1, wherein said separating means comprises a thin plate provided under an area between said first contact glass and a third bottom surface of said automatic document feeder, said third bottom surface including said second bottom surface of said second contact glass, said spacer means being moved underneath said thin plate when said image sensor is moved under said area.

12. The image scanner as claimed in claim 1, wherein said image sensor comprises an optical system which projects a light beam onto said original document placed on said first contact glass and receives the light beam reflected by said original document, the light beam reflected by said original document being focused on a light receiving element provided in said optical system, a length of an optical path between said original document and said light receiving element being greater than a distance between said original document and said light receiving element.

13. The image scanner as claimed in claim 12, wherein said spacer means comprises a plurality of rollers provided on said image sensor so that said rollers roll on said bottom surface of said first contact glass when said image sensor is moved under said first contact glass.

14. The image scanner as claimed in claim 12, wherein said optical system of said image sensor comprises:
   a lens array having a plurality of lenses aligned with a predetermined pitch;
   a roof mirror array having a plurality of roof mirrors arranged correspondingly to said lenses, a number of said lenses being equal to a number of said roof mirrors, one of said roof mirrors reflecting the light beam passed through a corresponding one of said lenses and returning the light beam to said corresponding one of said lenses; and
   a deflecting mirror deflecting the light beam twice passed through said corresponding one of said lenses to said light receiving element.

15. The image scanner as claimed in claim 14, wherein a focal point of said optical system of said image sensor is positioned inside said first contact glass so that the light beam passed through said first contact glass is focused on a top surface of said first contact glass.

16. The image scanner as claimed in claim 1, wherein said housing is made of a plastic having a low static charge characteristic.

17. An image scanner comprising:

a contact glass on which an original document is placed, said contact glass having a bottom surface opposite to a surface on which said original document is placed;

an image sensor scanning said original document while moving under said contact glass;

spacer means, provided on said image sensor, maintaining a distance between said image sensor and said contact glass to be constant by contacting said bottom surface of said contact glass when said image sensor is scanning said original document;

pressing means for pressing said image sensor via said spacer means against said bottom surface of said contact glass when said image sensor is scanning said original document; and a housing, formed by plastic molding, accommodating said image sensor, said first contact glass being mounted on said housing.

18. The image scanner as claimed in claim 17, wherein said housing has an opening to which said contact glass is mounted so that interior parts accommodated in said housing are assembled through said opening.

19. The image scanner as claimed in claim 17, wherein said housing is made of a plastic having a low static charge characteristic.

20. The image scanner as claimed in claim 17, wherein said housing has an integrally formed finished outer wall.

* * * * *